Patented Sept. 16, 1952

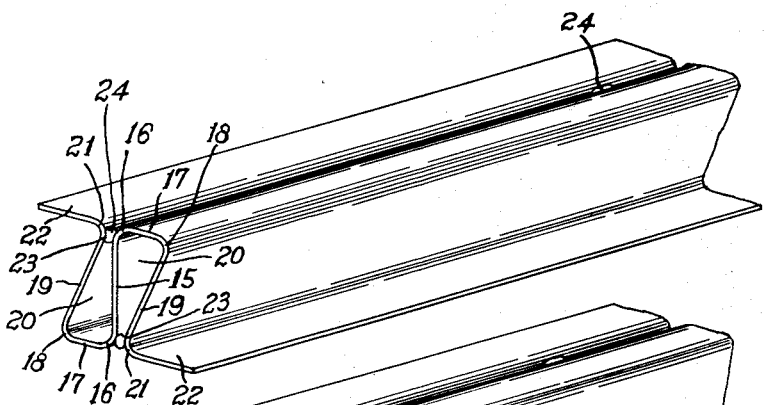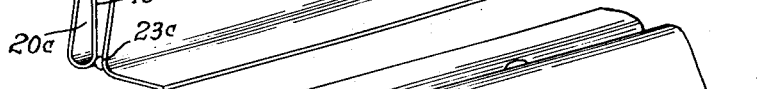

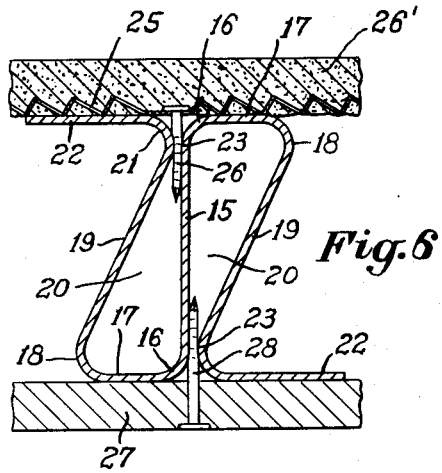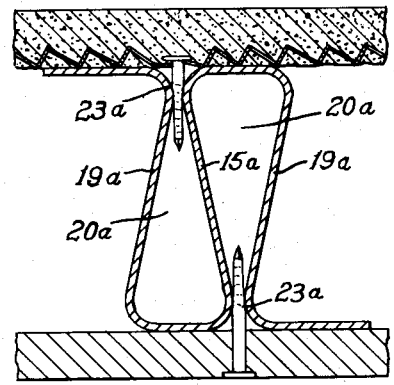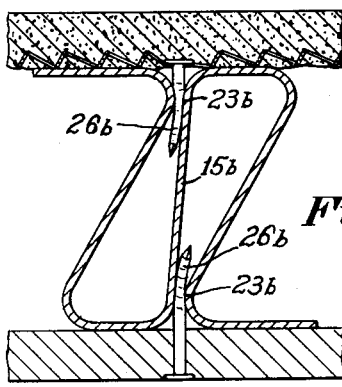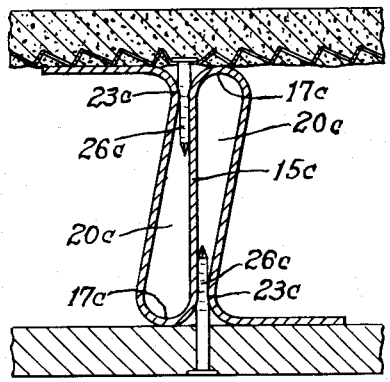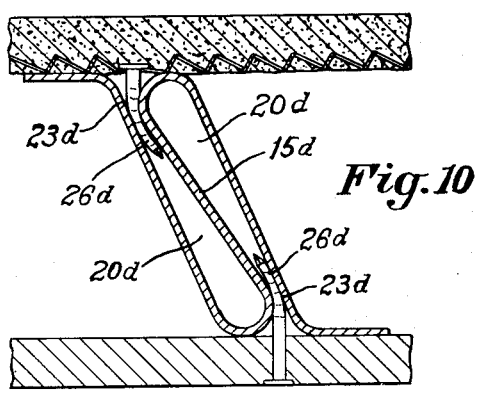

2,610,711

UNITED STATES PATENT OFFICE 2,610,711

DOUBLE V STUD SECTION

Stanley Macomber, North Canton, Ohio

Application October 16, 1948, Serial No. 54,843

4 Claims. (Cl. 189—34)

The invention relates to structural members, and more particularly to a double tubular or V-section stud, formed of strip or sheet metal of suitable cross sectional dimensions to be used as studs in a partition, or other wall, and providing nailing grooves on opposite sides of the stud to which metal lath, plaster board or other accessory material for forming walls may be quickly and easily applied as by nails, screws or similar fastening means.

In my prior application, Serial No. 640,820, for V-Section Structural Members, filed January 12, 1946, and now abandoned, I disclosed a metal stud formed of two similar structural members of V-section connected together so as to provide nailing grooves on opposite sides of the stud, and the present invention is an improvement upon such studs, as it provides an integral, structural member of sufficient cross sectional width to form a stud of conventional size, having a nailing groove in each side.

It is therefore an object of the present invention to provide a double tubular or V-section structural stud of simple and inexpensive construction which may be rolled or otherwise formed to any size requirements.

Another object is to provide such a stud which may be economically produced from one of the most inexpensive forms of raw steel strips.

A further object is to provide a double V-section structural stud in which the metal is placed where the requirement is the greatest.

A still further object is to provide a structural stud having maximum efficiency with a minimum amount of metal. Another important object is to provide a structural stud so constructed that it provides nailing grooves on opposite sides of the stud, to which accessory building material, such as metal lath, plaster board and the like, may be easily attached as by nails, screws or other fastening devices.

It is also an object of the invention to provide a double tubular or V-section structural stud having nailing slots or grooves the walls of which are rigid and held to a definite spacing regardless of the diameter of the nails or other fastening devices to be driven therein.

A further object is to provide a double tubular or V-section structural stud in which the walls of the nailing grooves present substantial surfaces to grip and retain the nails or other fastening devices driven into the grooves.

A still further object of the invention is the provision of a double tubular or V-section stud of the character referred to in which the walls of the nailing grooves are each formed upon a substantial radius so as to direct the nails, or other fastening devices, into the grooves.

Another object is to provide such a stud in which the walls of the grooves are so shaped as to bend the nails, or other fastening devices, driven into the grooves so as to provide an additional hold on the fastening devices.

The above and other objects apparent from the drawings and following description, may be attained, the above described difficulties overcome and the advantages and results obtained, by the apparatus, construction, arrangement and combinations, subcombinations and parts which comprise the present invention, preferred embodiments of which, illustrative of the best mode in which applicant has contemplated applying the principle, being set forth in detail in the following description and illustrated in the accompanying drawings, in which:

Figure 1 is a perspective view of a portion of a structural double V-section stud, embodying the invention;

Fig. 2 a similar view of a slightly modified form of the improved stud;

Fig. 3 a similar view of another modification in which the nailing grooves are shown in the longitudinal line of the stud;

Fig. 4 a similar view of a double tubular section form of the stud;

Fig. 5 a similar view of a modification, of the double tubular section stud which provides for an exaggerated bending of the nails or other fastening means driven into the grooves;

Fig. 6 an enlarged, horizontal, cross sectional view, through the center of the stud shown in Fig. 1, showing the manner of applying metal lath, plaster board or other building accessories thereto;

Fig. 7 a view similar to Fig. 6, showing the form of stud illustrated in Fig. 2;

Fig. 8 a similar view showing the form of stud illustrated in Fig. 3;

Fig. 9 a similar view of the type of stud illustrated in Fig. 4; and

Fig. 10 a similar view of the type of stud illustrated in Fig. 5.

Referring now more particularly to the embodiments of the invention illustrated in the drawings, in which similar numerals refer to similar parts throughout, as shown in Figs. 1 and 6 the double V-section structural stud may be rolled or otherwise formed from a strip or sheet of steel, or other suitable metal of necessary or desired gauge and of uniform width sufficient to produce the desired cross section.

The central portion of the strip forms the center or inner wall 15, extending transversely through the strip at right angles to the opposite faces of the stud. At the edges of this central wall the strip is oppositely bent arcuately as indicated at 16, upon a considerable radius, which as shown is more than twice the thickness of the metal, and then extended in opposite directions, at right angles to the central wall 15, forming the flat outer walls 17, the strip being again bent upon a considerable radius, as indicated at 18 and merging into the angular outer walls 19, forming the two similar, oppositely disposed V-sections, as indicated at 20.

At the apices of the V-sections the strip is again bent arcuately in opposite directions, upon the same radius as the bends 16, as indicated at 21, and terminates in the oppositely disposed, flat flanges 22, located in the plane of the flat end walls 17 of the V-sections.

A longitudinal groove or slot 23 is thus formed in the apex of each V-section, through which nails, screws or other fastening devices may be driven to secure metal lath, wall board or other accessory building material to opposite faces of the stud, in order to form a partition or other wall.

If desired, in order to hold the width of the grooves, or slots, 23 to a definite spacing, preferably less than the diameter of the nails or other fastening devices to be driven therein, as well as to stiffen and reinforce the structural stud and hold it rigidly in the formed position, each groove or slot 23 may be welded, riveted or otherwise connected at spaced intervals, as indicated at 24.

As shown in Fig. 6 metal lath, plaster board, wall board or other building accessory for forming an inside finish for a wall or partition, may be quickly and easily attached to opposite faces of the stud by nails or the like driven into the nailing grooves or slots 23.

For the purpose of illustration metal lath, as indicated at 25 is shown attached to one face of the stud by nails 26 driven into the nailing groove 23 on that side of the stud, the metal lath supporting a plaster coat, as indicated at 26', and on the other side of the stud a sheet of plaster board, wall board, plywood, insulation board, or the like as indicated at 27 may be attached to the adjacent face of the stud by nails 28 driven into the nailing groove 23 on that side of the stud.

The nails, screws or other fastening devices being preferably of larger diameter than the width of the nailing grooves 23 will cause the same to be tightly wedged into the grooves 23 when they are driven therein, so as to securely hold the accessory building material upon opposite sides of the stud.

In the modification shown in Figs. 2 and 7, the central wall 15a is located at a considerable angle, whereby the two V-sections 20a are symmetrical and the nailing grooves 23a at the apices thereof are spaced further from the transverse center line of the stud.

For this purpose the outer walls 19a of the V-sections are located at a lesser angle than the walls 19 in Figs. 1 and 6. Otherwise the stud shown in Figs. 2 and 7 may be the same as above described and accessory building material may be attached thereto by nails or the like driven into the nailing grooves 23a.

The modification shown in Figs. 3 and 8 has certain advantages not attained in the forms of stud above described. First, the nailing grooves 23b, on opposite sides of the stud, are located in the transverse center line of the stud, directly opposite to each other.

Furthermore, because of the angular location of the center wall 15b, the nails, or other fastening devices, used to attach accessory building material to the stud are caused to bend to one side as they are driven into the grooves 23b as indicated at 26b, thus giving an additional hold on the nails.

In the double tubular type of stud shown in Figs. 4 and 9 the structure is quite similar to that shown in Figs. 1 and 6, the central wall 15c being at right angles to the opposite faces of the stud. The tubular sections 20c, formed on each side of this central wall, are of less width than in the forms of the invention above described, the closed ends thereof being of semi-cylindrical shape as indicated at 17c. Otherwise this section may be as above described and accessory building material may be attached thereto by driving nails 26c into the nailing grooves 23c on opposite sides of the stud.

The form of stud shown in Figs. 5 and 10 is substantially the same as that shown in Figs. 4 and 9, excepting that the entire stud is distorted angularly, the central wall 15d being on a considerable angle and the two tubular or V-sections 20d, formed on each side thereof, being correspondingly located at a considerable angle. The nailing grooves 23d are necessarily located much further from the transverse center of the stud than in the other forms of the invention above described.

This form of stud has the advantage of considerably bending the nails used for attaching accessory building material to each side of the stud, as indicated at 26d, making an additional hold on the nails or other fastening devices.

Another advantage of a stud made in the manner described and illustrated herein is that owing to its structural shape it may be formed of very light gauge sheets or strips, whereby such studs may be economically produced.

According to the provisions of the patent statutes I have explained the principle of my invention and described several preferred embodiments thereof, but I desire to have it understood that within the scope of the appended claims, the invention may be practiced otherwise than as specifically illustrated and described, the invention residing in the formation of a stud from a single piece of sheet metal so formed as to produce two oppositely disposed tubular or V-sections forming nailing grooves at opposite sides of the stud.

I claim:

1. A structural stud for walls and the like, comprising a single strip of sheet metal of uniform cross section, longitudinally bent into double tubular form consisting of two transversely tapered tubular sections, the metal strip having a longitudinal central portion forming a common wall between said tubular sections the tubular sections being located on opposite sides of said common wall, the metal strip at each end of said common wall being bent arcuately in opposite directions, then toward the opposite end of the common wall at an angle thereto, extending to a point slightly laterally spaced from and in substantial lateral alignment with the opposite end of the common wall, the terminal portions of the strip being bent arcuately and outwardly, forming a transversely tapered tubular portion on each side of the common wall with a longitudinal nailing groove therein of predetermined width said nailing grooves being in oppositely facing sides of the stud, and parallel flanges at opposite sides of the stud.

2. A structural stud for walls and the like, comprising a single strip of sheet metal of uniform cross section, longitudinally bent into double tubular form consisting of two transversely tapered tubular sections, the metal strip having a longitudinal central portion forming a common wall between said tubular sections the tubular sections being located on opposite sides of said common wall, the metal strip at each end of said common wall being bent arcuately in opposite directions, then toward the opposite end of the common wall at an angle thereto, extending to a point slightly laterally spaced from and in substantial lateral alignment with the opposite end of the common wall, the terminal portions of the strip being bent arcuately and outwardly, forming a transversely tapered tubular portion on each side of the common wall with a longitudinal nailing groove therein of predetermined width said nailing grooves being in oppositely facing sides of the stud, and parallel flanges at opposite sides of the stud, and welds at spaced points in the entrances to the grooves for rigidly holding the walls thereof to a predetermined spacing.

3. A structural stud for walls and the like, comprising a single strip of sheet metal of uniform cross section, longitudinally bent into double triangular tubular form consisting of two triangular tubular sections, the metal strip having a longitudinal central portion forming a common wall between said tubular sections, the metal strip at each end of said common wall being bent arcuately in opposite directions then outwardly in opposite directions forming substantially flat portions, then toward the opposite end of the common wall at an angle thereto, extending to a point slightly laterally spaced from and in substantial alignment with the opposite end of the common wall, the terminal portions of the strip being bent arcuately and outwardly, forming a triangular tubular portion on each side of the common wall with a longitudinal nailing groove therein of predetermined width said nailing grooves being in oppositely facing sides of the stud, and parallel flanges at opposite sides of the stud, said parallel flanges being in lateral alignment with said flat portions.

4. A structural stud for walls and the like, comprising a single strip of sheet metal of uniform cross section, longitudinally bent into double triangular tubular form consisting of two triangular tubular sections, the metal strip having a longitudinal central portion of the metal strip forming a common wall between said tubular sections, the metal strip at each end of said common wall being bent arcuately in opposite directions then outwardly in opposite directions forming substantially flat portions, then toward the opposite end of the common wall at an angle thereto, extending to a point slightly laterally spaced from and in substantial alignment with the opposite end of the common wall, the terminal portions of the strip being bent arcuately and outwardly, forming a triangular tubular portion on each side of the common wall with a longitudinal nailing groove therein of a predetermined width said nailing grooves being in oppositely facing sides of the stud, parallel flanges at opposite sides of the stud said parallel flanges being in lateral alignment with said flat portions, and welds at spaced points in the entrances to the grooves for rigidly holding the walls thereof to a predtermined spacing.

STANLEY MACOMBER.

REFERENCES CITED

The following references are of record in the file of this patent:

UNITED STATES PATENTS

| Number | Name | Date |
| --- | --- | --- |
| 522,736 | Krause | July 10, 1894 |
| 717,923 | Rapp | Jan. 6, 1903 |
| 754,270 | Wittekind et al. | Mar. 8, 1904 |
| 910,757 | Wilson | Jan. 26, 1909 |
| 1,964,403 | Loucks | June 26, 1934 |
| 2,160,345 | Syak | May 30, 1939 |
| 2,171,540 | Calkins et al. | Sept. 5, 1939 |
| 2,384,849 | Pieri et al. | Sept. 18, 1945 |